United States Patent
Sasaki et al.

(10) Patent No.: US 11,402,117 B2
(45) Date of Patent: Aug. 2, 2022

(54) VENTILATION AND AIR CONDITIONING SYSTEM

(71) Applicant: Panasonic Intellectual Property Management Co., Ltd., Osaka (JP)

(72) Inventors: Masayuki Sasaki, Aichi (JP); Naoyuki Funada, Aichi (JP); Ayumi Konishi, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 26 days.

(21) Appl. No.: 17/268,893

(22) PCT Filed: Aug. 7, 2019

(86) PCT No.: PCT/JP2019/031161
§ 371 (c)(1),
(2) Date: Feb. 16, 2021

(87) PCT Pub. No.: WO2020/066320
PCT Pub. Date: Apr. 2, 2020

(65) Prior Publication Data
US 2021/0310684 A1   Oct. 7, 2021

(30) Foreign Application Priority Data
Sep. 27, 2018 (JP) .............................. JP2018-181127

(51) Int. Cl.
*G05B 15/02* (2006.01)
*F24F 11/63* (2018.01)
(Continued)

(52) U.S. Cl.
CPC .............. *F24F 11/63* (2018.01); *F24F 3/044* (2013.01); *F24F 7/06* (2013.01); *F24F 11/74* (2018.01);
(Continued)

(58) Field of Classification Search
CPC .. F24F 11/63; F24F 11/80; F24F 11/74; F24F 3/044; F24F 7/06; F24F 13/22;
(Continued)

(56) References Cited

U.S. PATENT DOCUMENTS 6,223,543 B1 * 5/2001 Sandelman .......... F24F 11/0008
62/93
7,082,772 B2 * 8/2006 Welch .................... F25B 21/04
62/3.4
(Continued)

FOREIGN PATENT DOCUMENTS

JP   H11-083076 A   3/1999
JP   2011-127845 A   6/2011
(Continued)

OTHER PUBLICATIONS

International Search Report issued in Patent Application No. PCT/JP2019/031161 dated Sep. 24, 2019.

*Primary Examiner* — Rocio Del Mar Perez-Velez
*Assistant Examiner* — Alicia M. Choi
(74) *Attorney, Agent, or Firm* — Pearne & Gordon LLP (57) ABSTRACT

A ventilation and air conditioning system includes: an air conditioner that cools air in an air conditioning room; a plurality of transfer air fans that are installed for a plurality of rooms, which are independent of the air conditioning room, in one-to-one correspondence and each deliver the air in the air conditioning room to a corresponding room; and a system controller. For each of the plurality of rooms, the system controller calculates a dew point temperature in the room on the basis of the temperature and the humidity in the room, determines, on the basis of the calculated dew point temperature in the room and the temperature in the air conditioning room, the occurrence of condensation resulting from delivery of the air in the air conditioning room to the
(Continued)

room, and controls, according to the result of the determination, the airflow of the transfer air fan corresponding to the room.

6 Claims, 6 Drawing Sheets (51) Int. Cl.
*F24F 11/80* (2018.01)
*F24F 11/74* (2018.01)
*F24F 3/044* (2006.01)
*F24F 7/06* (2006.01)
*F24F 13/22* (2006.01)
*F24F 110/20* (2018.01)
*F24F 110/10* (2018.01)

(52) U.S. Cl.
CPC .............. *F24F 11/80* (2018.01); *F24F 13/22* (2013.01); *G05B 15/02* (2013.01); *F24F 2013/221* (2013.01); *F24F 2110/10* (2018.01); *F24F 2110/20* (2018.01)

(58) Field of Classification Search
CPC ............... F24F 2110/20; F24F 2110/10; F24F 2013/221; F24F 11/30; F24F 3/1423; F05B 15/02
See application file for complete search history.

(56) References Cited

U.S. PATENT DOCUMENTS

| | | | |
|---|---|---|---|
| 7,508,671 B2 * | 3/2009 | Sauciuc ................. | G06F 1/206 165/185 |
| 2012/0228393 A1 * | 9/2012 | Storm .................. | F24F 11/0008 236/44 A |
| 2015/0136376 A1 * | 5/2015 | Niemann ............... | B60H 1/008 165/222 |
| 2017/0234564 A1 * | 8/2017 | Goel ..................... | F24F 3/1405 62/93 |
| 2018/0058711 A1 * | 3/2018 | Taplin ..................... | F24F 11/56 |

FOREIGN PATENT DOCUMENTS

| | | | | |
|---|---|---|---|---|
| JP | 2011-174674 A | | 9/2011 | |
| JP | 2015-170465 A | * | 8/2015 | ............... F24F 3/14 |
| JP | 2018-091547 A | | 6/2018 | |
| KR | 101334202 B1 | * | 11/2013 | ............. F24F 11/02 |

* cited by examiner

VENTILATION AND AIR CONDITIONING SYSTEM

TECHNICAL FIELD

The present disclosure relates to a ventilation and air conditioning system.

BACKGROUND ART

A conventionally known ventilation and air conditioning system controls air-conditioning in at least one independently installed air conditioning room in a highly insulated and airtight home including more than one room and distributes and supplies the air inside the air conditioning room to each room connected to the air conditioning room through an air duct (for example, Patent Literature (PTL) 1). In this ventilation and air conditioning system, the air inside the air conditioning room is individually distributed and supplied using a controller disposed in each room.

CITATION LIST

Patent Literature

PTL 1: Unexamined Japanese Patent Publication No. 2011-127845

SUMMARY OF THE INVENTION

Thus, in the conventional ventilation and air conditioning system, the air in the air conditioning room is distributed to the respective rooms. Therefore, for example, when the cooler is in use, if the temperature of the air inside the air conditioning room is lower than a dew point temperature calculated on the basis of the temperature and the humidity in one of the plurality of rooms, condensation that causes mold growth may occur in said room, which is problematic. Note that the dew point temperature is the temperature at which condensation starts, in other words, dew drops are formed, when air containing water vapor is cooled.

Another problem is that also when the temperature and the humidity in one of the plurality of rooms are high and the outdoor air temperature is low, condensation may occur in said room.

The present disclosure has an object to provide a ventilation and air conditioning system capable of reducing the occurrence of condensation.

In order to achieve this object, a ventilation and air conditioning system according to one aspect of the present disclosure includes: an air conditioner; a plurality of transfer air fans; a system controller; a plurality of room temperature sensors; a plurality of room humidity sensors; and an air conditioning room temperature sensor. The air conditioner cools the air in the air conditioning room. The transfer air fans, the room temperature sensors, and the room humidity sensors are installed for a plurality of rooms, which are independent of the air conditioning room, in one-to-one correspondence. Each transfer air fan delivers the air in the air conditioning room to a corresponding room. The system controller controls the transfer air fan and the air conditioner. Each room temperature sensor obtains the temperature in a corresponding room and transmits the temperature to the system controller. Each room humidity sensor obtains the humidity in a corresponding room and transmits the humidity to the system controller. The air conditioning room temperature sensor obtains the temperature of air in the air conditioning room and transmits the temperature of the air to the system controller. Furthermore, the system controller includes a dew point temperature calculator, a condensation determiner, and a fan airflow controller. The dew point temperature calculator calculates, for each of the plurality of rooms, the dew point temperature in said room on the basis of the temperature in said room that has been received from the room temperature sensor corresponding to said room and the humidity in said room that has been received from the room humidity sensor corresponding to said room. The condensation determiner determines, for each of the plurality of rooms, whether or not condensation is to occur when the air in the air conditioning room is delivered to said room, on the basis of the dew point temperature in said room that has been calculated by the dew point temperature calculator and the temperature in the air conditioning room that has been received from the air conditioning room temperature sensor. The fan airflow controller controls, for each of the plurality of rooms, the airflow of a transfer air fan corresponding to said room, in accordance with the result of the determination made by the condensation determiner for said room.

A ventilation and air conditioning system according to another aspect of the present disclosure includes: an air conditioner; a plurality of transfer air fans; a plurality of supply air fans; a system controller; and a plurality of room humidity sensors. The air conditioner controls air-conditioning in the air conditioning room. The transfer air fans, the supply air fans, and the room humidity sensors are installed for a plurality of rooms, which are independent of the air conditioning room, in one-to-one correspondence. Each transfer air fan delivers the air in the air conditioning room to a corresponding room. Each supply air fan delivers the air in the air conditioning room to a corresponding room. The system controller controls the transfer air fan, the supply air fan, and the air conditioner. Each room humidity sensor obtains the humidity in a corresponding room and transmits the humidity to the system controller. Furthermore, the system controller includes an air conditioning room target humidity obtainer, a humidity comparator, and a fan airflow controller. The air conditioning room target humidity obtainer obtains air conditioning room target humidity that has been set for the air conditioning room. The humidity comparator compares, for each of the plurality of rooms, the humidity in said room that has been received from the room humidity sensor and the air conditioning room target humidity that has been obtained by the air conditioning room target humidity obtainer. For each of the plurality of rooms, when the comparison of the humidity comparator indicates that the humidity in said room is higher than the air conditioning room target humidity, the fan airflow controller sets the airflow of a supply air fan corresponding to said room greater than the airflow of a transfer air fan corresponding to said room, and when the comparison of the humidity comparator indicates that the humidity in said room is lower than the air conditioning room target humidity, the fan airflow controller sets the airflow of a supply air fan corresponding to said room less than the airflow of a transfer air fan corresponding to said room.

With the ventilation and air conditioning system according to one aspect of the present disclosure, the dew point temperature calculator calculates the dew point temperature for each room on the basis of the temperature in said room that has been obtained from the room temperature sensor and the humidity in said room that has been obtained from the room humidity sensor. On the basis of each dew point temperature calculated by the dew point temperature calculator and the air conditioning room temperature obtained by the air conditioning room temperature sensor, the condensation determiner determines, for a corresponding room, the occurrence of condensation resulting from delivery of the air in the air conditioning room to said room. Furthermore, in accordance with the result of the determination of the condensation determiner, the fan airflow controller controls the airflow of each of the transfer air fans installed for the plurality of rooms in one-to-one correspondence. This produces the advantageous effect of allowing the air in the air conditioning room to be delivered to each room while reducing the occurrence of condensation.

With the ventilation and air conditioning system according to another aspect of the present disclosure, the humidity comparator compares the humidity in each of the plurality of rooms that has been obtained by the room humidity sensor and the air conditioning room target humidity obtained by the air conditioning target humidity obtainer. Furthermore, in accordance with the result of the comparison of the humidity comparator, the fan airflow controller controls the airflow of a supply air fan corresponding to a room having humidity higher than the air conditioning room target humidity so that the airflow becomes greater than the airflow of a transfer air fan corresponding to said room. Moreover, in accordance with the result of the comparison of the humidity comparator, the fan airflow controller controls the airflow of a supply air fan corresponding to a room having humidity lower than the air conditioning room target humidity so that the airflow becomes less than the airflow of a transfer air fan corresponding to said room. Accordingly, the humid air quickly moves from a high-humidity room to a low-humidity room through the air conditioning room, and thus the humidity in the high-humidity room can be quickly lowered. This produces the advantageous effect of reducing the occurrence of condensation.

DESCRIPTION OF EMBODIMENTS

Hereinafter, exemplary embodiments of the present disclosure will be described with reference to the accompanying drawings. Note that each of the exemplary embodiments described below shows one specific preferred example of the present disclosure. The numerical values, shapes, materials, structural elements, the arrangement and connection of the structural elements, steps, the processing order of the steps, etc., shown in the following exemplary embodiments are mere examples, and therefore do not limit the present disclosure. As such, among the structural elements in the following exemplary embodiments, structural elements not recited in any one of the independent claims which indicate the broadest concepts of the present disclosure are described as arbitrary structural elements.

Furthermore, in the respective figures, substantially identical elements are assigned the same reference marks, and overlapping description is omitted or simplified.

First Exemplary Embodiment

Figure 1:
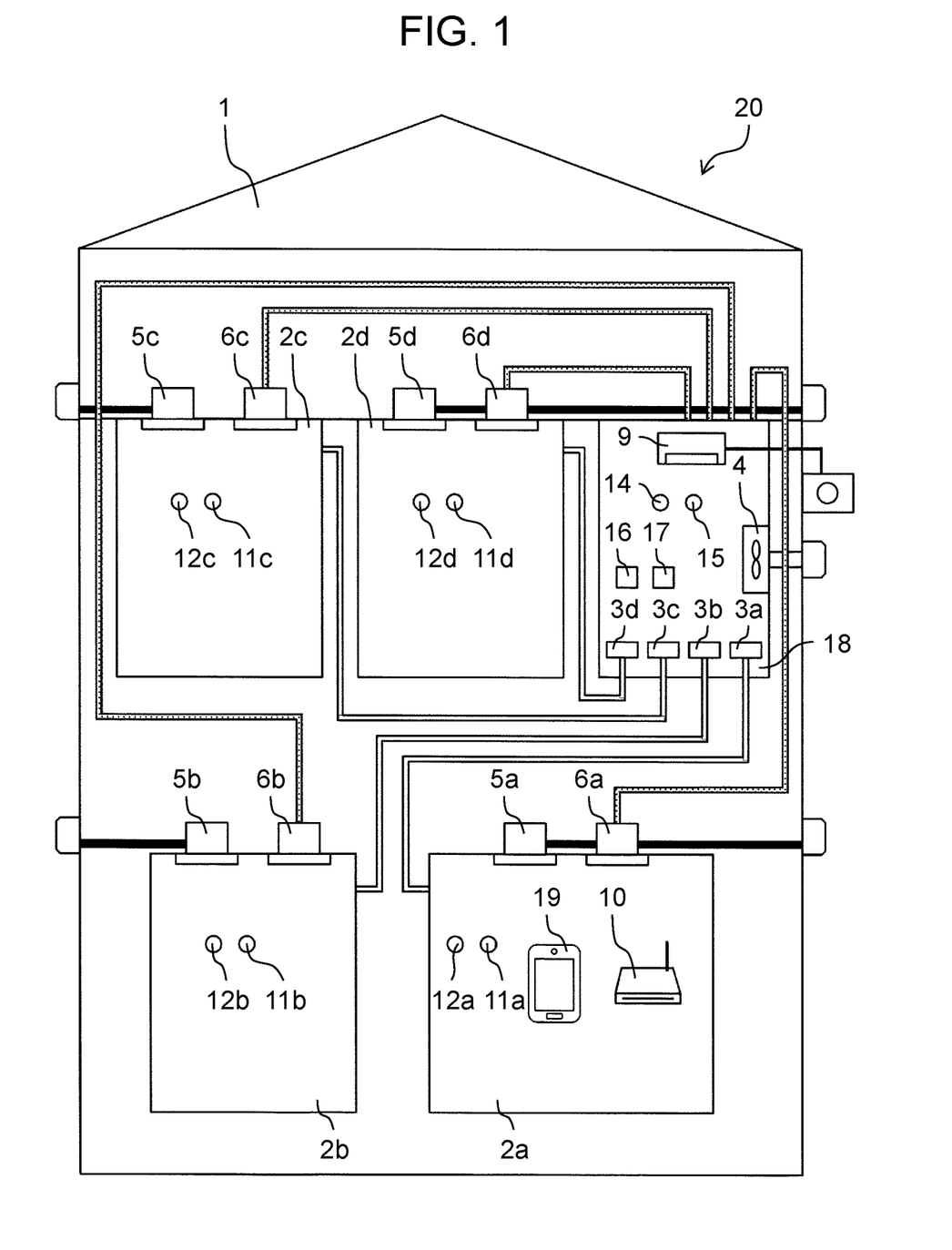
FIG. 1 is a schematic diagram of connection in a ventilation and air conditioning system according to the first exemplary embodiment of the present disclosure.

First, ventilation and air conditioning system 20 according to the first exemplary embodiment of the present disclosure will be described with reference to FIG. 1. FIG. 1 is a schematic diagram of connection in ventilation and air conditioning system 20 according to the present first exemplary embodiment.

Ventilation and air conditioning system 20 includes outdoor air intake fan 4, a plurality of exhaust fans 5a, 5b, 5c, 5d, a plurality of transfer air fans 3a, 3b, 3c, 3d, a plurality of supply air fans 6a, 6b, 6c, 6d, room temperature sensors 11a, 11b, 11c, 11d, room humidity sensors 12a, 12b, 12c, 12d, air conditioning room temperature sensor 14, air conditioning room humidity sensor 15, air conditioner 9, humidifier 16, dehumidifier 17, input and output terminal 19, and system controller 10.

Ventilation and air conditioning system 20 is installed inside general house 1 which is an example of a building. General house 1 includes a plurality of (in the present exemplary embodiment, as an example, four) rooms 2a to 2d and also includes at least one air conditioning room 18 independent of rooms 2a to 2d. Here, general house 1 (home) is a residence provided as a place where a resident conducts his or her private life; typical examples of the rooms include a living room, a dining room, a bedroom, a private room, and a children's room. The rooms provided by ventilation and air conditioning system 20 may include a water closet, a bathroom, a vanity unit, a dressing area, and so on.

Outdoor air is drawn by outdoor air intake fan 4 into air conditioning room 18 and mixed up in air conditioning room 18 with the air delivered from rooms 2a to 2d by supply air fans 6a to 6d. The temperature and the humidity of the air in air conditioning room 18 are adjusted using air conditioner 9, humidifier 16, and dehumidifier 17 installed in air conditioning room 18. The air adjusted in air conditioning room 18 is delivered by transfer air fans 3a to 3d to rooms 2a to 2d.

The air in rooms 2a to 2d is not only delivered by supply air fans 6a to 6d to air conditioning room 18, but also exhausted, as outdoor air, by exhaust fans 5a to 5d from rooms 2a to 2d to the outside of general house 1.

In this manner, ventilation and air conditioning system 20 controls the exhaust airflows of exhaust fans 5a to 5d to exhaust the air in the rooms as outdoor air while controlling, in coordination with the exhaust airflows of exhaust fans 5a to 5d, the supply airflow of outdoor air intake fan 4 to draw outdoor air into the rooms. In other words, ventilation and air conditioning system 20 performs ventilation using the class 1 ventilation system in which air is mechanically supplied and exhausted.

Here, outdoor air intake fan 4 draws outdoor air into the rooms in general house 1 and, for example, corresponds to an air supply fan, the air supply function of a heat exchanger fan, or the like. As mentioned above, the outdoor air drawn in by outdoor air intake fan 4 is introduced into air conditioning room 18. Outdoor air intake fan 4 is configured so that the settings for the supply airflow thereof are available at multiple levels, and as described later, the supply airflow of outdoor air intake fan 4 is set according to the exhaust airflows of exhaust fans 5a to 5d.

Exhaust fans 5a to 5d exhaust, as outdoor air, a portion of the air in corresponding rooms 2a to 2d and, for example, correspond to a ceiling ventilation fan, a wall mount ventilation fan, a range hood, the exhaust function of a heat exchanger fan, or the like. As illustrated in FIG. 1, exhaust fan 5a is installed in room 2a, exhaust fan 5b is installed in room 2b, exhaust fan 5c is installed in room 2c, and exhaust fan 5d is installed in room 2d.

Each of exhaust fans 5a to 5d is configured so that the settings for the exhaust airflow thereof are available at multiple levels. At a normal time, system controller 10 controls each of exhaust fans 5a to 5d so that the exhaust airflow thereof matches a preset exhaust airflow. In addition, system controller 10 controls the exhaust airflow of each of exhaust fans 5a to 5d according to user settings or values obtained by various sensors, for example.

Transfer air fans 3a to 3d are installed in air conditioning room 18 for rooms 2a to 2d, respectively, and deliver the air in air conditioning room 18 to corresponding rooms 2a to 2d. Specifically, the air in air conditioning room 18 is delivered by transfer air fan 3a to room 2a, is delivered by transfer air fan 3b to room 2b, is delivered by transfer air fan 3c to room 2c, and is delivered by transfer air fan 3d to room 2d. In other words, a room corresponding to transfer air fan 3a is room 2a and likewise, rooms corresponding to transfer air fans 3b, 3c, 3d are rooms 2b, 2c, 2d, respectively.

Supply air fans 6a to 6d are installed for rooms 2a to 2d, respectively, and deliver the air in air conditioning room 18 to corresponding rooms 2a to 2d. Specifically, supply air fan 6a is installed in room 2a, supply air fan 6b is installed in room 2b, supply air fan 6c is installed in room 2c, and supply air fan 6d is installed in room 2d. In other words, a room corresponding to supply air fan 6a is room 2a and likewise, rooms corresponding to supply air fans 6b, 6c, 6d are rooms 2b, 2c, 2d, respectively. A portion of the air in each of rooms 2a to 2d is delivered by a corresponding one of supply air fans 6a to 6d to air conditioning room 18.

Air conditioner 9 corresponds to said air conditioner and controls air-conditioning in air conditioning room 18. Air conditioner 9 cools or heats the air in air conditioning room 18 to match the temperature of the air in air conditioning room 18 to a preset target temperature (hereinafter also referred to as an "air conditioning room target temperature").

When the humidity of the air in air conditioning room 18 is lower than preset target humidity (hereinafter also referred to as "air conditioning room target humidity"), humidifier 16 humidifies the air in air conditioning room 18 to match the humidity thereof to the air conditioning room target humidity.

When the humidity of the air in air conditioning room 18 is higher than the preset air conditioning room target humidity, dehumidifier 17 dehumidifies the air in air conditioning room 18 to match the humidity thereof to the air conditioning room target humidity.

Room temperature sensor 11a is installed in room 2a, room temperature sensor 11b is installed in room 2b, room temperature sensor 11c is installed in room 2c, and room temperature sensor 11d is installed in room 2d. In other words, a room corresponding to room temperature sensor 11a is room 2a and likewise, rooms corresponding to room temperature sensors 11b, 11c, 11d are rooms 2b, 2c, 2d, respectively. Room temperature sensors 11a to 11d obtain temperatures in corresponding rooms 2a to 2d and transmit the temperatures to system controller 10.

Room humidity sensor 12a is installed in room 2a, room humidity sensor 12b is installed in room 2b, room humidity sensor 12c is installed in room 2c, and room humidity sensor 12d is installed in room 2d. In other words, a room corresponding to room humidity sensor 12a is room 2a and likewise, rooms corresponding to room humidity sensors 12b, 12c, 12d are rooms 2b, 2c, 2d, respectively. Room humidity sensors 12a to 12d obtain humidity in corresponding rooms 2a to 2d and transmit the humidity to system controller 10.

Air conditioning room temperature sensor 14 obtains the temperature of air in air conditioning room 18 (hereinafter also referred to as an "air conditioning room temperature") and transmits the temperature to system controller 10. Air conditioning room humidity sensor 15 obtains the humidity of air in air conditioning room 18 and transmits the humidity to system controller 10.

System controller 10 controls the entirety of ventilation and air conditioning system 20. System controller 10 is wirelessly connected so as to be able to communicate with outdoor air intake fan 4, exhaust fans 5a to 5d, transfer air fans 3a to 3d, supply air fans 6a to 6d, room temperature sensors 11a to 11d, room humidity sensors 12a to 12d, air conditioning room temperature sensor 14, air conditioning room humidity sensor 15, air conditioner 9, humidifier 16, and dehumidifier 17.

System controller 10 controls outdoor air intake fan 4 and exhaust fans 5a to 5d in coordination, for example, by setting the supply airflow of outdoor air intake fan 4 to an airflow corresponding to the exhaust airflows of exhaust fans 5a to 5d. This allows ventilation using the class 1 ventilation system in general house 1.

Furthermore, system controller 10 controls air-conditioning in air conditioning room 18 on the basis of the temperature and the humidity of the air in air conditioning room 18 obtained by air conditioning room temperature sensor 14 and air conditioning room humidity sensor 15. Specifically, system controller 10 controls air conditioner 9, which serves as said air conditioner, humidifier 16, and dehumidifier 17 so that at least one of the temperature and the humidity in air conditioning room 18 match at least one of the air conditioning room target temperature and the air conditioning room target humidity that have been set for air conditioning room 18.

Moreover, system controller 10 sets the airflows of transfer air fans 3a to 3d, the airflows of supply air fans 6a to 6d, and so on. These airflow settings are performed according to at least one of the temperatures and the humidity in rooms 2a to 2d obtained by room temperature sensors 11a to 11d and room humidity sensors 12a to 12d, and at least one of the target temperatures and the target humidity that have been set for respective rooms 2a to 2d. Hereinafter, the target temperature set for each of rooms 2a to 2d will also be referred to as a "room target temperature", and the target humidity set for each of rooms 2a to 2d will also be referred to as "room target humidity".

Note that as a method for controlling the airflows of transfer air fans 3a to 3d and supply air fans 6a to 6d, a method using the room target temperature will be described in the present first exemplary embodiment, and a method using the room target humidity will be described in the later-described third exemplary embodiment.

With this, the air adjusted in air conditioning room 18 is delivered to rooms 2a to 2d at the airflow rates that have been set for respective transfer air fans 3a to 3d, and the air in rooms 2a to 2d is delivered to air conditioning room 18 at the airflow rates that have been set for respective supply air fans 6a to 6d. Thus, at least one of the temperatures and the humidity in rooms 2a to 2d are controlled to match at least one of the room target temperature and the room target humidity.

As mentioned above, system controller 10 is wirelessly connected to outdoor air intake fan 4, exhaust fans 5a to 5d, transfer air fans 3a to 3d, supply air fans 6a to 6d, room temperature sensors 11a to 11d, room humidity sensors 12a to 12d, air conditioning room temperature sensor 14, air conditioning room humidity sensor 15, air conditioner 9, humidifier 16, and dehumidifier 17. Thus, it is possible to eliminate the need for complex wiring work. However, all of these elements, or system controller 10 and some of these elements, may be configured to be able to communicate with each other by wired communication.

Input and output terminal 19 is wirelessly connected so as to be able to communicate with system controller 10 and receives, from a user, input of information required to build ventilation and air conditioning system 20. Input and output terminal 19 causes system controller 10 to store the received information, obtains the state of ventilation and air conditioning system 20 from system controller 10, and displays the obtained state. Examples of input and output terminal 19 include mobile information terminals such as a cell phone, a smartphone, and a tablet.

Note that input and output terminal 19 does not necessarily need to be wirelessly connected to system controller 10 and may be connected so as to be able to communicate with system controller 10 by wired communication. In this case, input and output terminal 19 may be provided, for example, in the form of a wall mount remote controller.

Figure 2:
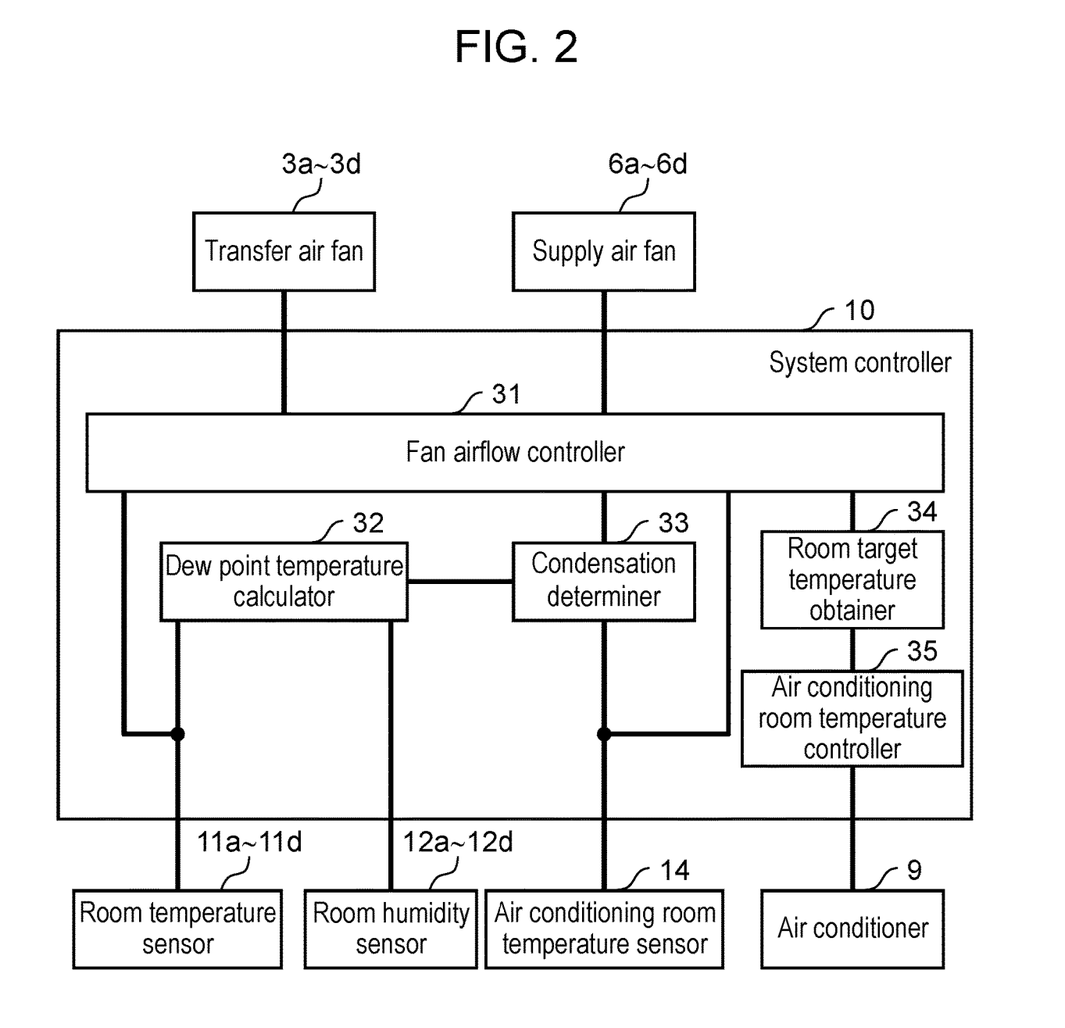
FIG. 2 is a schematic function block diagram of a system controller in the ventilation and air conditioning system.

Next, each function of system controller 10 will be described with reference to FIG. 2. FIG. 2 is a schematic function block diagram of system controller 10.

System controller 10 includes at least dew point temperature calculator 32, condensation determiner 33, room target temperature obtainer 34, air conditioning room temperature controller 35, and fan airflow controller 31.

Dew point temperature calculator 32 calculates a dew point temperature (a temperature at which condensation occurs due to a decrease in temperature) in each of rooms 2a to 2d. The dew point temperatures in rooms 2a to 2d are calculated on the basis of the temperatures in rooms 2a to 2d that have been obtained from room temperature sensors 11a to 11d and the humidity in rooms 2a to 2d that has been obtained from room humidity sensors 12a to 12d.

Specifically, first, dew point temperature calculator 32 calculates absolute humidity in rooms 2a to 2d on the basis of the temperatures in rooms 2a to 2d that have been obtained from room temperature sensors 11a to 11d and the humidity in rooms 2a to 2d that has been obtained from room humidity sensors 12a to 12d. Subsequently, for each of rooms 2a to 2d, dew point temperature calculator 32 determines, as the dew point temperature, a temperature at which the calculated absolute humidity reaches the saturated water vapor content.

On the basis of the dew point temperatures in rooms 2a to 2d that have been calculated by dew point temperature calculator 32 and the air conditioning room temperature obtained from air conditioning room temperature sensor 14, condensation determiner 33 determines, for each of rooms 2a to 2d, whether or not condensation is to occur when the air in air conditioning room 18 is delivered to rooms 2a to 2d. Specifically, when the air in air conditioning room 18 is delivered to a room having a dew point temperature higher than the air conditioning room temperature, the air having a temperature lower than the dew point temperature is delivered to said room, and therefore condensation determiner 33 determines that condensation is to occur.

Room target temperature obtainer 34 obtains a plurality of room target temperatures that have been set using input and output terminal 19 for respective rooms 2a to 2d.

Air conditioning room temperature controller 35 controls air conditioner 9, which serves as said air conditioner, so that the temperature in air conditioning room 18 becomes lower than or equal to the lowest one of the plurality of room target temperatures for rooms 2a to 2d that have been obtained by room target temperature obtainer 34.

Fan airflow controller 31 controls the airflow of each of the plurality of transfer air fans 3a to 3d and the airflow of each of the plurality of supply air fans 6a to 6d in accordance with the result of the determination made by condensation determiner 33 for a corresponding one of the plurality of rooms 2a to 2d.

Specifically, for the room determined by condensation determiner 33 as a room in which condensation is not to occur, fan airflow controller 31 causes a corresponding transfer air fan (one of transfer air fans 3a to 3d) to operate at an airflow rate (hereinafter also referred to as a "reaching airflow rate") at which the temperature in said room reaches the room target temperature set by input and output terminal 19 for said room.

This reaching airflow rate is determined according to the room target temperature for said room that has been obtained by room target temperature obtainer 34, the temperature in said room that has been obtained by a corresponding one of room temperature sensors 11a to 11d, and the temperature in air conditioning room 18 (air conditioning room temperature) that has been controlled by air conditioning room temperature controller 35. Accordingly, for the room determined by condensation determiner 33 as a room in which condensation is not to occur, a corresponding one of transfer air fans 3a to 3d is controlled to operate at the reaching airflow rate, and thus the temperature in said room can quickly approach the room target temperature.

Furthermore, for the room determined by condensation determiner 33 as a room in which condensation is not to occur, fan airflow controller 31 causes a corresponding one of supply air fans 6a to 6d to operate at the same reaching airflow rate as that of the corresponding one of the transfer air fans (one of transfer air fans 3a to 3d). Thus, it is possible to stabilize the balance between supply air and exhaust air in room 2a.

On the other hand, for the room determined by condensation determiner 33 as a room in which condensation is to occur, fan airflow controller 31 causes a corresponding one of transfer air fans 3a to 3d to operate at an airflow rate (hereinafter referred to as a "condensation-reducing airflow rate") less than the reaching airflow rate. Accordingly, it is possible to avoid the occurrence of condensation by slowly lowering the temperature in the corresponding room, or it is possible to lower the temperature in the room while reducing the speed at which condensation occurs. Thus, ventilation and air conditioning system 20 can reduce the occurrence of condensation.

Furthermore, for the room determined by condensation determiner 33 as a room in which condensation is to occur, fan airflow controller 31 causes a corresponding one of supply air fans 6a to 6d to operate at an airflow rate greater than the condensation-reducing airflow rate. Accordingly, a large amount of air in the humid room can return to air conditioning room 18 through the corresponding one of supply air fans 6a to 6d.

Subsequently, the air that has returned to air conditioning room 18 is distributed again to the plurality of rooms 2a to 2d through transfer air fans 3a to 3d. Thus, ventilation and air conditioning system 20 can lower the humidity in a high-humidity room and increase the humidity in a low-humidity room. Furthermore, since dehumidifier 17 installed in air conditioning room 18 can dehumidify the air in air conditioning room 18, condensation control is easier than in the case of preparing a dehumidifier for each of the plurality of rooms 2a to 2d.

Figure 3:
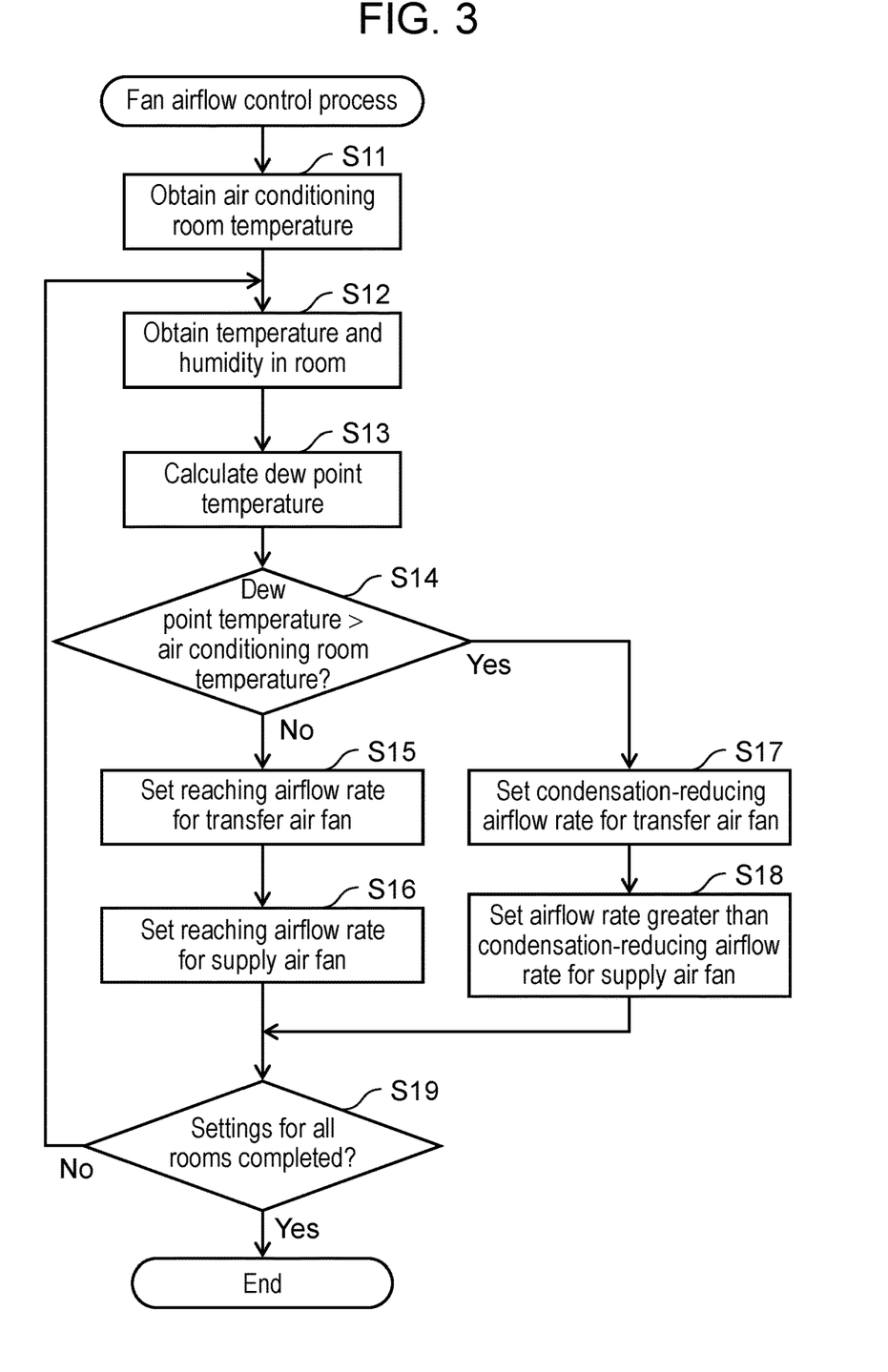
FIG. 3 is a flowchart illustrating a fan airflow control process that is performed by the system controller.

Next, a fan airflow control process that is performed by system controller 10 will be described with reference to FIG. 3. FIG. 3 is a flowchart illustrating the fan airflow control process. This fan airflow control process is performed by system controller 10 in each predetermined interval of time (for example, one minute) to control the airflow of each of transfer air fans 3a to 3d and supply air fans 6a to 6d.

When the fan airflow control process starts, first, system controller 10 obtains the temperature in air conditioning room 18 using air conditioning room temperature sensor 14 (Step S11).

Next, system controller 10 obtains the temperature and the humidity in one room subject to settings among rooms 2a to 2d from the room temperature sensor (one of room temperature sensors 11a to 11d) and the room humidity sensor (one of room humidity sensors 12a to 12d) that correspond to said one room (Step S12).

Subsequently, dew point temperature calculator 32 of system controller 10 calculates a dew point temperature in the one room from the temperature and the humidity in said room that have been obtained through the process in Step S12 (Step S13).

Next, condensation determiner 33 of system controller 10 determines whether or not the dew point temperature in the one room that has been calculated through the process in Step S13 is higher than the temperature of the air in air conditioning room 18 that has been obtained through the process in Step S11 (Step S14). This allows condensation determiner 33 to determine whether or not condensation is to occur in said room.

When the dew point temperature calculated for the one room is higher than the temperature of the air in air conditioning room 18 as a result of the process in Step S14 (Step S14: Yes), condensation determiner 33 determines that condensation is to occur in said one room. Subsequently, fan airflow controller 31 of system controller 10 performs the processes in Step S17 and Step S18.

Specifically, fan airflow controller 31 sets the aforementioned condensation-reducing airflow rate for the transfer air fan (one of transfer air fans 3a to 3d) corresponding to the one room (Step S17). Accordingly, the temperature in the room determined as a room in which condensation is to occur can be slowly lowered, and thus it is possible to avoid the occurrence of condensation, or it is possible to lower the temperature in the room while reducing the speed at which condensation occurs.

Next, fan airflow controller 31 sets an airflow rate greater than the condensation-reducing airflow rate for the supply air fan (one of supply air fans 6a to 6d) corresponding to the one room (Step S18). This allows ventilation and air conditioning system 20 to efficiently recover the air in the high-humidity room to air conditioning room 18 by making the amount of air flowing out of the room greater than the amount of air flowing in the room. Thus, ventilation and air conditioning system 20 can efficiently lower the humidity in a high-humidity room and increase the humidity in a low-humidity room.

On the other hand, when the dew point temperature calculated for the one room is lower than or equal to the temperature of the air in air conditioning room 18 as a result of the process in Step S14 (Step S14: No), condensation determiner 33 determines that condensation is not to occur in said one room. Subsequently, fan airflow controller 31 performs the processes in Step S15 and Step S16.

Specifically, fan airflow controller 31 sets the aforementioned reaching airflow rate for the transfer air fan (one of transfer air fans 3a to 3d) corresponding to the one room (Step S15). Accordingly, for the room determined as a room in which condensation is not to occur, the corresponding transfer air fan (one of transfer air fans 3a to 3d) is controlled at the reaching airflow rate greater than the condensation-reducing airflow rate, and thus the temperature in said room can quickly approach the room target temperature.

Next, fan airflow controller 31 sets the same airflow rate as the reaching airflow rate for the supply air fan (one of supply air fans 6a to 6d) corresponding to the one room (Step S16). This allows fan airflow controller 31 to cause the corresponding supply air fan (one of supply air fans 6a to 6d) to operate at the same reaching airflow rate as that of the corresponding transfer air fan (one of transfer air fans 3a to 3d) for the room determined by condensation determiner 33 as a room in which condensation is not to occur. Thus, it is possible to stabilize the balance between supply air and exhaust air in room 2a.

After the process in Step S16 or the process in Step S18, system controller 10 determines whether settings of the airflows of corresponding transfer air fans 3a to 3d and corresponding supply air fans 6a to 6d for all the rooms have been completed (Step S19).

As a result, when there is any room left for which the airflow settings have not been completed (Step S19: No), system controller 10 returns to Step S12 and performs the processes in Step S12 to Step S18 for the room for which the airflow settings have not been completed. On the other hand, when the airflow settings for all the rooms have been completed (Step S19: Yes), the fan airflow control process ends.

As described above, in ventilation and air conditioning system 20 according to the first exemplary embodiment, dew point temperature calculator 32 calculates a dew point temperature for each of rooms 2a to 2d on the basis of the temperatures in the rooms that have been obtained from room temperature sensors 11a to 11d and the humidity in the rooms that has been obtained from room humidity sensors 12a to 12d. On the basis of the dew point temperatures in rooms 2a to 2d that have been calculated by dew point temperature calculator 32 and the air conditioning room temperature obtained by air conditioning room temperature sensor 14, condensation determiner 33 determines whether or not condensation is to occur when the air in air conditioning room 18 is delivered to each of rooms 2a to 2d.

Subsequently, on the basis of the result of the determination of condensation determiner 33, fan airflow controller 31 controls the airflow of each of the plurality of transfer air fans 3a to 3d installed for the plurality of rooms 2a to 2d in one-to-one correspondence. This allows the air in air conditioning room 18 to be delivered to each room while reducing the occurrence of condensation.

Second Exemplary Embodiment

Next, a ventilation and air conditioning system according to the second exemplary embodiment will be described with reference to FIG. 4.

In ventilation and air conditioning system 20 according to the first exemplary embodiment, for the room determined by condensation determiner 33 as a room in which condensation is to occur, fan airflow controller 31 causes a corresponding supply air fan (one of supply air fans 6a to 6d) to operate at an airflow rate greater than the condensation-reducing airflow rate.

In contrast, in the ventilation and air conditioning system according to the second exemplary embodiment, for the room determined by condensation determiner 33 as a room in which condensation is to occur, a fan airflow controller according to the second exemplary embodiment causes a corresponding supply air fan (one of supply air fans 6a to 6d) to operate at an airflow rate greater than the reaching airflow rate.

The following describes the ventilation and air conditioning system according to the second exemplary embodiment, focusing on points of difference from ventilation and air conditioning system 20 according to the first exemplary embodiment. Elements that are the same as those in ventilation and air conditioning system 20 according to the first exemplary embodiment are assigned the same reference marks, and description thereof is omitted.

Figure 4:
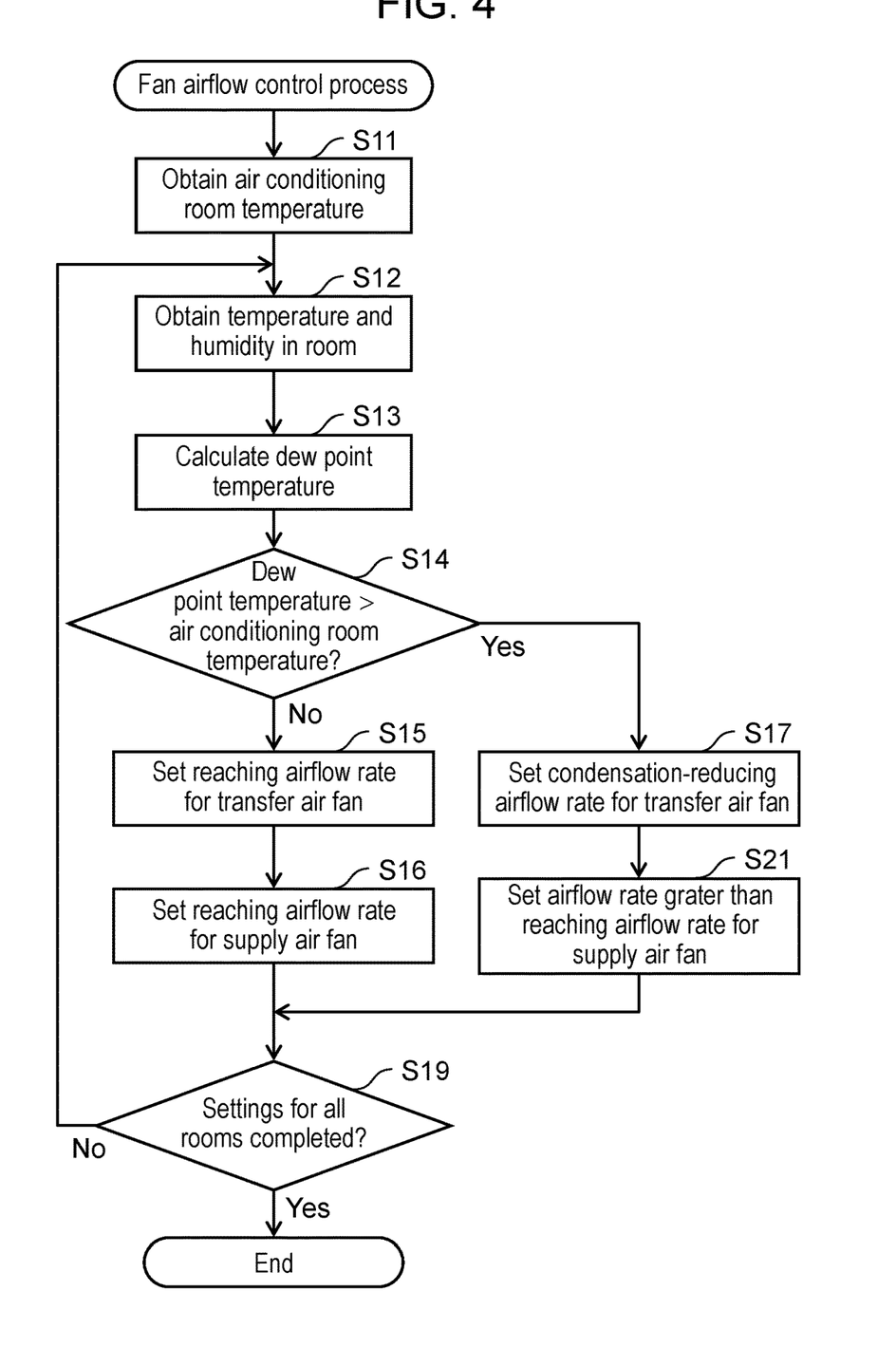
FIG. 4 is a flowchart illustrating a fan airflow control process that is performed by a system controller in a ventilation and air conditioning system according to the second exemplary embodiment of the present disclosure.

FIG. 4 is a flowchart illustrating a fan airflow control process that is performed by a system controller in the ventilation and air conditioning system according to the second exemplary embodiment.

This fan airflow control process is different from the fan airflow control process that is performed by system controller 10 according to the first exemplary embodiment in that the process in Step S21 is performed instead of the process in Step S18.

Specifically, when the dew point temperature calculated for one room is higher than the temperature of the air in air conditioning room 18 (air conditioning room temperature) and it is determined that condensation is to occur in said one room (Step S14: Yes) as a result of the process in Step S14, the following process is performed. In other words, the fan airflow controller according to the second exemplary embodiment performs the process in Step 21 immediately after the process in Step S17. In the process in Step S21, an airflow rate greater than the aforementioned reaching airflow rate is set for the supply air fan (one of supply air fans 6a to 6d) corresponding to the one room. After the process in Step S21, system controller 10 transitions to the process in Step S19.

This process in Step S21 allows the ventilation and air conditioning system according to the second exemplary embodiment to bring a larger amount of air in the humid room back to air conditioning room 18 than in the first exemplary embodiment.

Subsequently, the air that has returned to air conditioning room 18 is distributed again to the plurality of rooms 2a to 2d through transfer air fans 3a to 3d. Thus, the ventilation and air conditioning system according to the second exemplary embodiment is capable of quickly lowering the humidity in a high-humidity room and quickly increasing the humidity in a low-humidity room. Furthermore, since dehumidifier 17 installed in air conditioning room 18 can dehumidify the air in air conditioning room 18, condensation control is easier than in the case of preparing a dehumidifier for each of the plurality of rooms 2a to 2d.

Aside from that, with substantially the same configuration as ventilation and air conditioning system 20 according to the first exemplary embodiment, the ventilation and air conditioning system according to the second exemplary embodiment produces the same advantageous effects.

Third Exemplary Embodiment

Next, a ventilation and air conditioning system according to the third exemplary embodiment will be described with reference to FIG. 5 and FIG. 6.

In ventilation and air conditioning system 20 according to the first exemplary embodiment, condensation determiner 33 determines whether or not condensation is to occur when the air in air conditioning room 18 is delivered to a room. Subsequently, in the case described above, on the basis of the result of the determination, fan airflow controller 31 controls the airflow of each of the plurality of transfer air fans 3a to 3d installed for the plurality of rooms 2a to 2d in one-to-one correspondence.

In contrast, in the ventilation and air conditioning system according to the third exemplary embodiment, humidity comparator 37 compares the humidity in each of the plurality of rooms that has been obtained by room humidity sensors 12a to 12d and the air conditioning room target humidity obtained by air conditioning room target humidity obtainer 36. Subsequently, on the basis of the result of the comparison, the airflows of transfer air fans 3a to 3d and the airflows of supply air fans 6a to 6d are controlled.

The following describes the ventilation and air conditioning system according to the third exemplary embodiment, focusing on points of difference from ventilation and air conditioning system 20 according to the first exemplary embodiment. Elements that are the same as those in ventilation and air conditioning system 20 according to the first exemplary embodiment are assigned the same reference marks, and description thereof is omitted.

Figure 5:
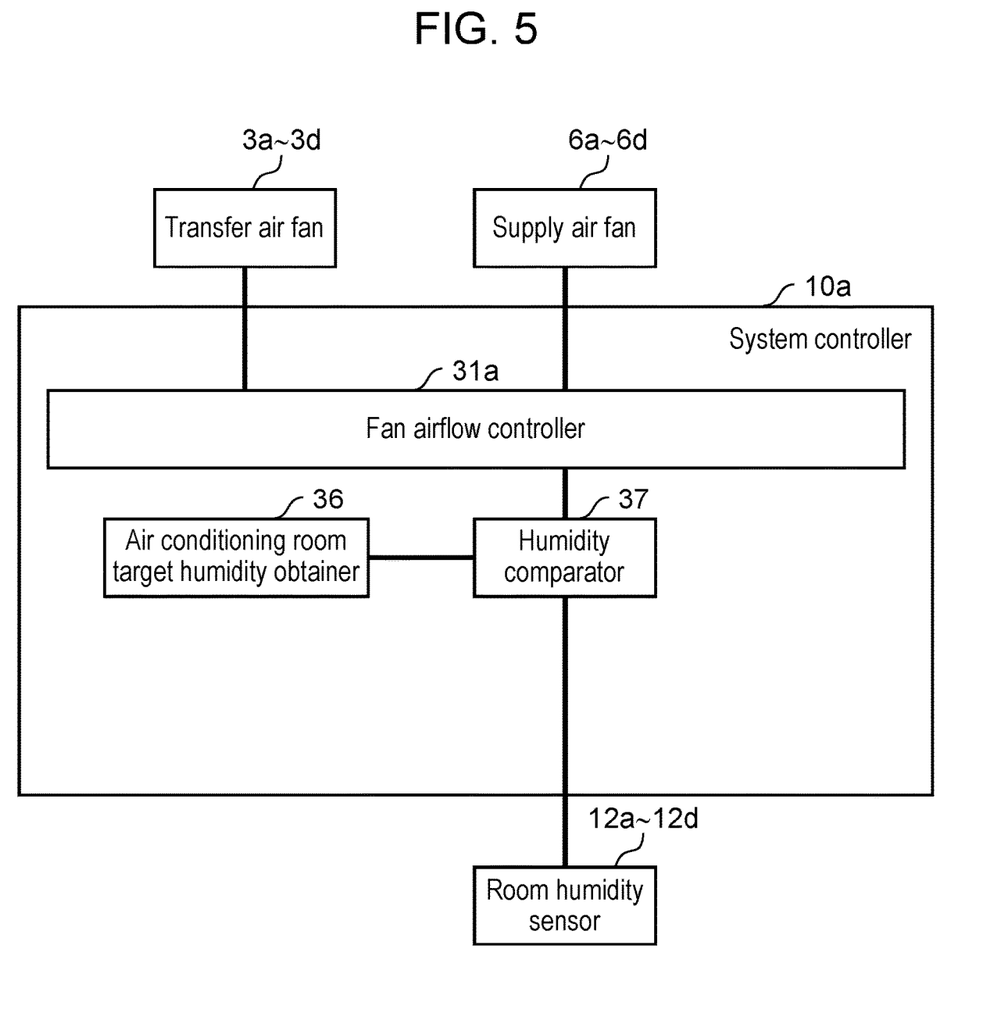
FIG. 5 is a schematic function block diagram of a system controller in a ventilation and air conditioning system according to the third exemplary embodiment of the present disclosure.
Figure 6:
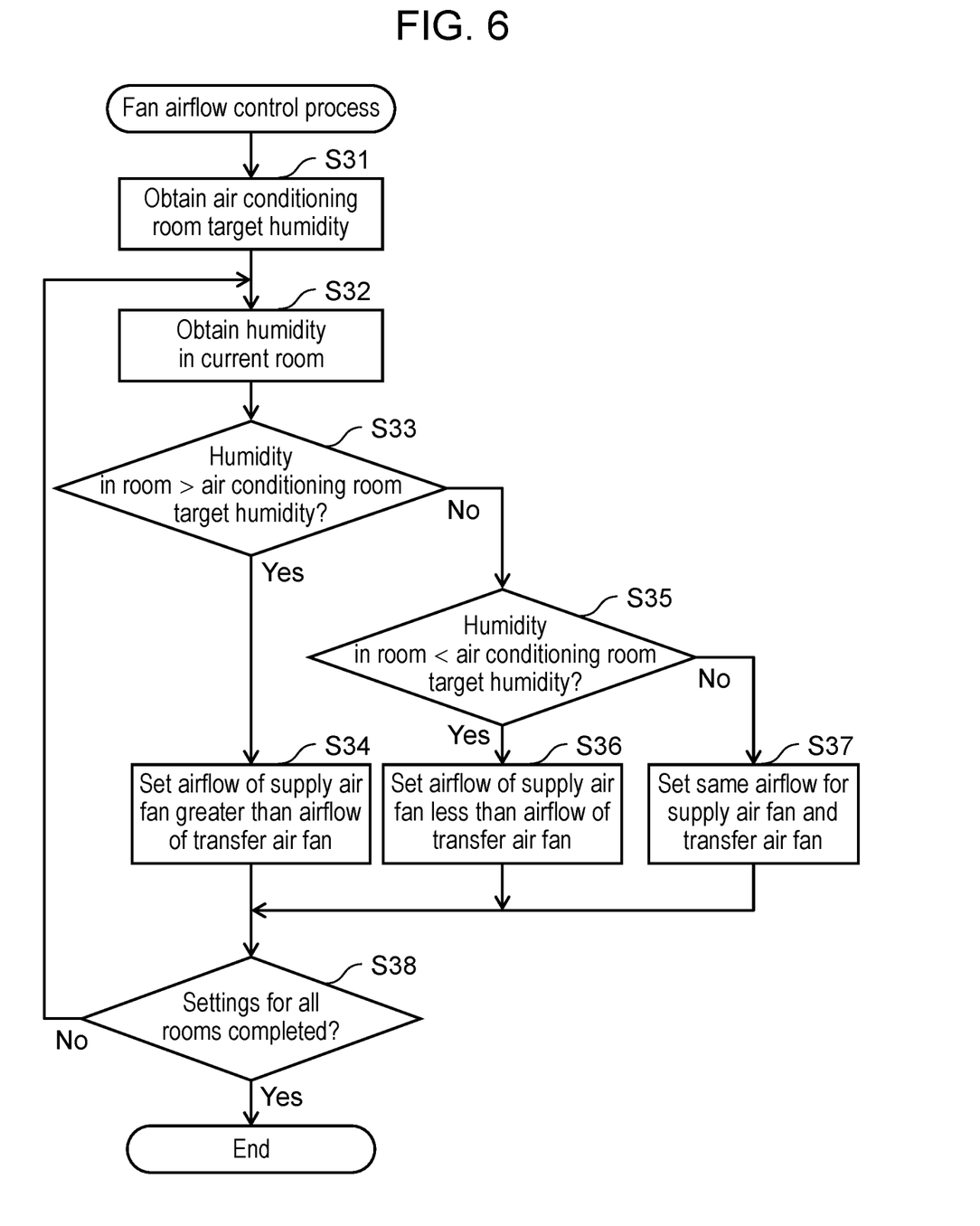
FIG. 6 is a flowchart illustrating a fan airflow control process that is performed by the system controller.

FIG. 5 is a schematic function block diagram of system controller 10a in the ventilation and air conditioning system according to the third exemplary embodiment.

System controller 10a according to the third exemplary embodiment includes at least fan airflow controller 31a, air conditioning room target humidity obtainer 36, and humidity comparator 37.

Here, air conditioning room target humidity obtainer 36 obtains the target humidity of air conditioning room 18 (air conditioning room target humidity) set by a user through input and output terminal 19.

Humidity comparator 37 compares the humidity in each of the plurality of rooms 2a to 2d that has been obtained by room humidity sensors 12a to 12d and the air conditioning room target humidity obtained by air conditioning room target humidity obtainer 36.

In accordance with the result of the determination of humidity comparator 37, fan airflow controller 31a controls the airflows of supply air fans 6a to 6d and transfer air fans 3a to 3d. Specifically, fan airflow controller 31a performs control such that the airflow of a supply air fan (one of supply air fans 6a to 6d) corresponding to a room having humidity higher than the air conditioning room target humidity becomes greater than the airflow of a transfer air fan (one of transfer air fans 3a to 3d) corresponding to said room. Furthermore, fan airflow controller 31a performs control such that the airflow of a supply air fan (one of supply air fans 6a to 6d) corresponding to a room having humidity lower than the air conditioning room target humidity becomes less than the airflow of a transfer air fan (one of transfer air fans 3a to 3d) corresponding to said room. Moreover, fan airflow controller 31a performs control such that the airflow of a supply air fan (one of supply air fans 6a to 6d) corresponding to a room having a humidity equal to the air conditioning room target humidity becomes equal to the airflow of a transfer air fan (one of transfer air fans 3a to 3d) corresponding to said room.

Here, a fan airflow control process that is performed by system controller 10a according to the third exemplary embodiment will be described with reference to FIG. 6. FIG. 6 is a flowchart illustrating the fan airflow control process. Similar to the first exemplary embodiment, this fan airflow control process is performed by system controller 10a in each predetermined interval of time (for example, one minute) to control the airflow of each of transfer air fans 3a to 3d and supply air fans 6a to 6d.

When the fan airflow control process starts, first, air conditioning room target humidity obtainer 36 of system controller 10a obtains the target humidity in air conditioning room 18 (air conditioning room target humidity) set by a user through input and output terminal 19 (Step S31).

Next, system controller 10a obtains the humidity in one room subject to settings among rooms 2a to 2d from a corresponding room humidity sensor (one of room humidity sensors 12a to 12d) (Step S32). Subsequently, humidity comparator 37 of system controller 10a determines whether or not the humidity in the one room that has been obtained in the process in Step S32 is higher than the air conditioning room target humidity obtained in the process in Step S31 (Step S33).

When the humidity in the one room is higher than the air conditioning room target humidity as a result of the process in Step S33 (Step S33: Yes), fan airflow controller 31a of system controller 10a performs control such that the airflow of a supply air fan (one of supply air fans 6a to 6d) corresponding to said one room becomes greater than the airflow of a transfer air fan (one of transfer air fans 3a to 3d) corresponding to said one room (Step S34). This allows a large amount of humid air to move from a high-humidity room to air conditioning room 18.

When the humidity in the one room is not higher than the air conditioning room target humidity as a result of the process in Step S33 (Step S33: No), humidity comparator 37 determines whether or not the humidity in the one room that has been obtained in the process in Step S32 is lower than the air conditioning room target humidity obtained in the process in Step S31 (Step S35).

When the humidity in the one room is lower than the air conditioning room target humidity as a result of the process in Step S35 (Step S35: Yes), fan airflow controller 31a performs control such that the airflow of a supply air fan (one of supply air fans 6a to 6d) corresponding to said one room becomes less than the airflow of a transfer air fan (one of transfer air fans 3a to 3d) corresponding to said one room (Step S36). This allows a large amount of humid air to move from air conditioning room 18 to a low-humidity room.

Note that when the humidity in the one room is not higher than the air conditioning room target humidity (Step S33: No) and the humidity in the one room is not lower than the air conditioning room target humidity (Step 35: No), the humidity in the one room is equal to the air conditioning room target humidity. Thus, in this case, fan airflow controller 31a performs control such that the airflow of a supply air fan (one of supply air fans 6a to 6d) corresponding to said one room becomes equal to the airflow of a transfer air fan (one of transfer air fans 3a to 3d) corresponding to said one room (Step S37).

After the process in Step S34, Step S36, or Step S37, system controller 10a determines whether settings of the airflows of corresponding transfer air fans 3a to 3d and corresponding supply air fans 6a to 6d for all the rooms have been completed (Step S38).

As a result, when there is any room left for which the airflow settings have not been completed (Step S38: No), system controller 10a returns to Step S32 and performs the processes in Step S32 to Step S37 for the room for which the airflow settings have not been completed. On the other hand, when the airflow settings for all the rooms have been completed (Step S38: Yes), the fan airflow control process ends.

As described above, in the ventilation and air conditioning system according to the third exemplary embodiment, fan airflow controller 31a performs control such that the airflow of a supply air fan (one of supply air fans 6a to 6d) corresponding to the room determined by humidity comparator 37 as having humidity higher than the air conditioning room target humidity becomes greater than the airflow of a transfer air fan (one of transfer air fans 3a to 3d) corresponding to said room. This allows a large amount of humid air to move from a high-humidity room to air conditioning room 18.

Furthermore, in the ventilation and air conditioning system according to the third exemplary embodiment, fan airflow controller 31a performs control such that the airflow of a supply air fan (one of supply air fans 6a to 6d) corresponding to the room determined by humidity comparator 37 as having humidity lower than the air conditioning room target humidity becomes less than the airflow of a transfer air fan (one of transfer air fans 3a to 3d) corresponding to said room. This allows a large amount of humid air to move from air conditioning room 18 to a low-humidity room.

In this manner, in the ventilation and air conditioning system according to the third exemplary embodiment, humid air quickly moves from a high-humidity room to a low-humidity room through air conditioning room 18, and thus it is possible to quickly lower the humidity in the high-humidity room. Thus, the ventilation and air conditioning system according to the third exemplary embodiment can reduce the occurrence of condensation in a high-humidity room.

Although the present disclosure has been thus far described on the basis of the exemplary embodiments, the present disclosure is not limited to the exemplary embodiments described above, and it can easily be inferred that various improvements and modifications are possible within the spirit or scope of the present disclosure. For example, each exemplary embodiment may be modified by adding thereto one or more portions of the elements included in another exemplary embodiment or by exchanging one or more portions of the elements included therein with one or more portions of the elements included in another exemplary embodiment. The numerical values cited in the above exemplary embodiments are mere examples; it is of course possible to use other numerical values.

The above exemplary embodiments describe the cases where system controllers 10, 10a are installed independently of outdoor air intake fan 4, exhaust fans 5a to 5d, and the like. In other words, system controllers 10, 10a are described as serving as a hub, meaning that system controllers 10, 10a and outdoor air intake fan 4 communicate with each other, and system controllers 10, 10a and each of exhaust fans 5a to 5d communicate with each other. Regarding this feature, outdoor air intake fan 4 and each of exhaust fans 5a to 5d may directly communicate with each other and operate in coordination to perform the control. In this case, system controllers 10, 10a may be built in outdoor air intake fan 4.

Furthermore, the above exemplary embodiments describe the case where supply air fans 6a to 6d and transfer air fans 3a to 3d are in communication by ducts connecting rooms 2a to 2d and air conditioning room 18. However, supply air fans 6a to 6d do not necessarily need to be connected by the ducts, meaning that the space connecting rooms 2a to 2d such as corridors can be regarded as the ducts. In this case, air in rooms 2a to 2d is delivered by supply air fans 6a to 6d from rooms 2a to 2d to the corridors. The air in rooms 2a to 2d that has been delivered to the corridors is drawn into air conditioning room 18 which is in communication with the corridors. The air may be drawn into air conditioning room 18 by an air-drawing fan provided in a wall surface of the air conditioning room that faces the corridors, or may be drawn into air conditioning room 18 by a reduction in pressure therein without using at least one of the supply air fans and the air-drawing fan. Even such a configuration can contribute to humidity equalization although the efficiency of circulation is expected to be lower than that in the case where the ducts are used for the connection.

The air conditioning room target temperature for air conditioning room 18 may be determined on the basis of the temperatures in rooms 2a to 2d obtained by room temperature sensors 11a to 11d and the target temperature (room target temperature) set for each of rooms 2a to 2d. Similarly, the air conditioning room target humidity may be determined on the basis of the humidity in rooms 2a to 2d obtained by room humidity sensors 12a to 12d and the target humidity (room target humidity) set for each of rooms 2a to 2d.

Furthermore, the air conditioning room target temperature and the air conditioning room target humidity in air conditioning room 18 may be determined on the basis of the dew point temperature in each room that has been calculated by dew point temperature calculator 32, or only one of the air conditioning room target temperature and the air conditioning room target humidity may be determined on the basis of the dew point temperature in each room.

INDUSTRIAL APPLICABILITY

The ventilation and air conditioning system according to the present disclosure is applicable, for example, to an independent house and a housing complex such as a condominium. Note that when the ventilation and air conditioning system is applied to a housing complex, a single system is used for each unit, meaning that it is not that each unit is regarded as one room.

REFERENCE MARKS IN THE DRAWINGS 1 general house
2a room
2b room
2c room
2d room
3a transfer air fan
3b transfer air fan
3c transfer air fan
3d transfer air fan
4 outdoor air intake fan
5a exhaust fan
5b exhaust fan
5c exhaust fan
5d exhaust fan
6a supply air fan
6b supply air fan
6c supply air fan
6d supply air fan
10 air conditioner
10 system controller
10a system controller
11a room temperature sensor
11b room temperature sensor
11c room temperature sensor
11d room temperature sensor
12a room humidity sensor
12b room humidity sensor
12c room humidity sensor
12d room humidity sensor
14 air conditioning room temperature sensor
15 air conditioning room humidity sensor
16 humidifier
17 dehumidifier
18 air conditioning room
19 input and output terminal
20 ventilation and air conditioning system
31 fan airflow controller
31a fan airflow controller
32 dew point temperature calculator
33 condensation determiner
34 room target temperature obtainer
35 air conditioning room temperature controller
36 air conditioning room target humidity obtainer
37 humidity comparator

The invention claimed is:

1. A ventilation and air conditioning system, comprising:
an air conditioner configured to cool air in an air conditioning room;
a plurality of transfer air fans that are installed for a plurality of rooms in one-to-one correspondence and each deliver the air in the air conditioning room to a corresponding one of the plurality of rooms, the plurality of rooms being independent of the air conditioning room;
a system controller configured to control the plurality of transfer air fans and the air conditioner;
a plurality of room temperature sensors that are installed for the plurality of rooms in one-to-one correspondence, each obtain a temperature in a corresponding one of the plurality of rooms, and transmit the temperature to the system controller;
a plurality of room humidity sensors that are installed for the plurality of rooms in one-to-one correspondence, each obtain humidity in a corresponding one of the plurality of rooms, and transmit the humidity to the system controller; and
an air conditioning room temperature sensor configured to obtain a temperature of the air in the air conditioning room and transmits the temperature of the air to the system controller,
wherein the system controller includes:
a dew point temperature calculator configured to calculate a dew point temperature in each of the plurality of rooms on the basis of the temperature received from each of the plurality of room temperature sensors that corresponds to each of the plurality of rooms and the humidity received from one of the plurality of room humidity sensors that corresponds to each of the plurality of rooms;
a condensation determiner controller configured to determine, on the basis of the dew point temperature in each of the plurality of rooms that has been calculated by the dew point temperature calculator and the temperature in the air conditioning room that has been received from the air conditioning room temperature sensor, whether or not condensation is to occur in one or more of the plurality of rooms when the air in the air conditioning room is delivered to the one or more of the plurality of rooms; and a fan airflow controller configured to control, according to a result of the determination of the condensation determiner controller for each of the plurality of rooms, an airflow of one of the plurality of transfer air fans that corresponds to the room.

2. The ventilation and air conditioning system according to claim 1, wherein the system controller further includes:

a room target temperature obtainer controller configured to obtain a plurality of room target temperatures set one for each of the plurality of rooms; and an air conditioning room temperature controller configured to control the temperature in the air conditioning room via the air conditioner to make the temperature in the air conditioning room lower than or equal to a lowest room target temperature among the plurality of room target temperatures obtained by the room target temperature obtainer controller, and for each of the plurality of rooms, the fan airflow controller determines the airflow of one of the plurality of transfer air fans that corresponds to the room, on the basis of a corresponding one of the plurality of room target temperatures for the room that has been obtained by the room target temperature obtainer controller, the temperature in the room that has been received from a corresponding one of the plurality of room temperature sensors, the temperature in the air conditioning room that has been controlled by the air conditioning room temperature controller, and the result of the determination of the condensation determiner controller for the room.

3. The ventilation and air conditioning system according to claim 2, wherein for a room among the plurality of rooms that has been determined by the condensation determiner controller as a room in which the condensation is not to occur, the fan airflow controller controls one of the plurality of transfer air fans that corresponds to the room, to cause the transfer air fan to operate at a reaching airflow rate for causing the temperature in the room to reach a corresponding one of the plurality of room target temperatures for the room, and for a room among the plurality of rooms that has been determined by the condensation determiner controller as a room in which the condensation is to occur, the fan airflow controller controls one of the plurality of transfer air fans that corresponds to the room, to cause the transfer air fan to operate at a condensation-reducing airflow rate less than the reaching airflow rate.

4. The ventilation and air conditioning system according to claim 2, further comprising:

supply air fans that are installed for the plurality of rooms in one-to-one correspondence and each deliver air in a corresponding one of the plurality of rooms to the air conditioning room, wherein for a room among the plurality of rooms that has been determined by the condensation determiner controller as a room in which the condensation is not to occur, the fan airflow controller controls one of the plurality of transfer air fans and one of the supply air fans that correspond to the room, to cause each of the transfer air fan and the supply air fan to operate at a reaching airflow rate for causing the temperature in the room to reach a corresponding one of the plurality of room target temperatures for the room, and for a room among the plurality of rooms that has been determined by the condensation determiner controller as a room in which the condensation is to occur, the fan airflow controller controls one of the plurality of transfer air fans that corresponds to the room, to cause the transfer air fan to operate at a condensation-reducing airflow rate less than the reaching airflow rate, and controls one of the supply air fans that corresponds to the room, to cause the supply air fan to operate at an airflow rate greater than the condensation-reducing airflow rate.

5. The ventilation and air conditioning system according to claim 2, further comprising:

supply air fans that are installed for the plurality of rooms in one-to-one correspondence and each deliver air in a corresponding one of the plurality of rooms to the air conditioning room, wherein for a room among the plurality of rooms that has been determined by the condensation determiner controller as a room in which the condensation is not to occur, the fan airflow controller controls one of the plurality of transfer air fans and one of the supply air fans that correspond to the room, to cause each of the transfer air fan and the supply air fan to operate at a reaching airflow rate for causing the temperature in the room to reach a corresponding one of the plurality of room target temperatures for the room, and for a room among the plurality of rooms that has been determined by the condensation determiner controller as a room in which the condensation is to occur, the fan airflow controller controls one of the plurality of transfer air fans that corresponds to the room, to cause the transfer air fan to operate at the reaching airflow rate, and controls one of the supply air fans that corresponds to the room, to cause the supply air fan to operate at an airflow rate greater than the reaching airflow rate.

6. A ventilation and air conditioning system, comprising: an air conditioner configured to control air-conditioning in an air conditioning room; a plurality of transfer air fans that are installed for a plurality of rooms in one-to-one correspondence and each deliver air in the air conditioning room to a corresponding one of the plurality of rooms, the plurality of rooms being independent of the air conditioning room;

a plurality of supply air fans that are installed for the plurality of rooms in one-to-one correspondence and each deliver air in a corresponding one of the plurality of rooms to the air conditioning room;

a system controller configured to control the plurality of transfer air fans, the plurality of supply air fans, and the air conditioner; and a plurality of room humidity sensors that are installed for the plurality of rooms in one-to-one correspondence, each obtain humidity in a corresponding one of the plurality of rooms, and transmit the humidity to the system controller, wherein the system controller includes:

an air conditioning room target humidity obtainer controller configured to obtain air conditioning room target humidity set for the air conditioning room;

a humidity comparator configured to compare, for each of the plurality of rooms, the humidity in the room that has been received from a corresponding one of the plurality of room humidity sensors and the air conditioning room target humidity obtained by the air conditioning room target humidity obtainer controller; and a fan airflow controller configured to, for each of the plurality of rooms, when the comparison of the humidity comparator indicates that the humidity in the room is higher than the air conditioning room target humidity, sets an airflow of one of the plurality of supply air fans that corresponds to the room greater than an airflow of one of the plurality of transfer air fans that corresponds to the room, and when the comparison of the humidity comparator indicates that the humidity in the room is lower than the air conditioning room target humidity, set the airflow of one of the plurality of supply air fans that corresponds to the room less than the airflow of one of the plurality of transfer air fans that corresponds to the room.

\* \* \* \* \*